(12) United States Patent
Theelen

(10) Patent No.: US 10,206,368 B2
(45) Date of Patent: Feb. 19, 2019

(54) MILKING SYSTEM WITH SPARE PART MANAGEMENT

(71) Applicant: LELY PATENT N.V., Maassluis (NL)

(72) Inventor: Antoon Peter Andre Theelen, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 15/780,646

(22) PCT Filed: Nov. 28, 2016

(86) PCT No.: PCT/NL2016/050834
§ 371 (c)(1),
(2) Date: Jun. 1, 2018

(87) PCT Pub. No.: WO2017/099584
PCT Pub. Date: Jun. 15, 2017

(65) Prior Publication Data
US 2018/0368351 A1 Dec. 27, 2018

(30) Foreign Application Priority Data
Dec. 11, 2015 (NL) ...................................... 2015945

(51) Int. Cl.
*A01J 5/007* (2006.01)
*B33Y 10/00* (2015.01)
(Continued)

(52) U.S. Cl.
CPC ............... *A01J 5/007* (2013.01); *A01J 5/044* (2013.01); *A01J 5/16* (2013.01); *B33Y 10/00* (2014.12); *B33Y 50/02* (2014.12); *B33Y 80/00* (2014.12)

(58) Field of Classification Search
CPC .. A01J 5/007; A01J 5/08; B33Y 10/00; B33Y 50/02; B33Y 80/00
(Continued)

(56) References Cited

U.S. PATENT DOCUMENTS

2002/0139309 A1 10/2002 Van Den Berg et al.
2009/0177418 A1* 7/2009 Innings ................... A01J 5/007
702/51
(Continued)

FOREIGN PATENT DOCUMENTS

EP          1 245 150 A1   10/2002
WO   WO 2014/078960 A1    5/2014
WO   WO 2014/098739 A1    6/2014

OTHER PUBLICATIONS

International Search Report dated Mar. 21, 2017 in PCT/NL2016/050834, filed Nov. 28, 2016.

*Primary Examiner* — Yvonne R Abbott-Lewis
(74) *Attorney, Agent, or Firm* — Oblon, McClelland, Maier & Neustadt, L.L.P.

(57) ABSTRACT

A milking system includes a milking apparatus for milking of dairy animals, and a plurality of wearing parts, inclusive of teat liners and/or milk lines and/or pulsation lines. The system further includes a computer system configured to control and/or monitor the milking apparatus, and to generate a signal which indicates that one of the wearing parts should be replaced and provides a characterization of that wearing part. The milking system further includes a 3D printer operatively connected to the computer system and configured to print the characterized part on the basis of the generated signal. Thus it is not necessary to keep an unnecessarily large stock of spare parts, but it becomes possible to directly provide the spare parts quickly, cheaply and with (Continued)

less chance of errors. Moreover, it is thus possible to tailor the parts, especially teat liners, to animals.

12 Claims, 1 Drawing Sheet

(51) Int. Cl.
*A01J 5/16* (2006.01)
*B33Y 80/00* (2015.01)
*A01J 5/04* (2006.01)
*B33Y 50/02* (2015.01)

(58) Field of Classification Search
USPC .................. 119/14.08, 14.03, 14.01, 14.18
See application file for complete search history.

(56) References Cited

U.S. PATENT DOCUMENTS

2015/0289470 A1   10/2015   Bahlenberg
2015/0313172 A1   11/2015   Johnston et al.

\* cited by examiner

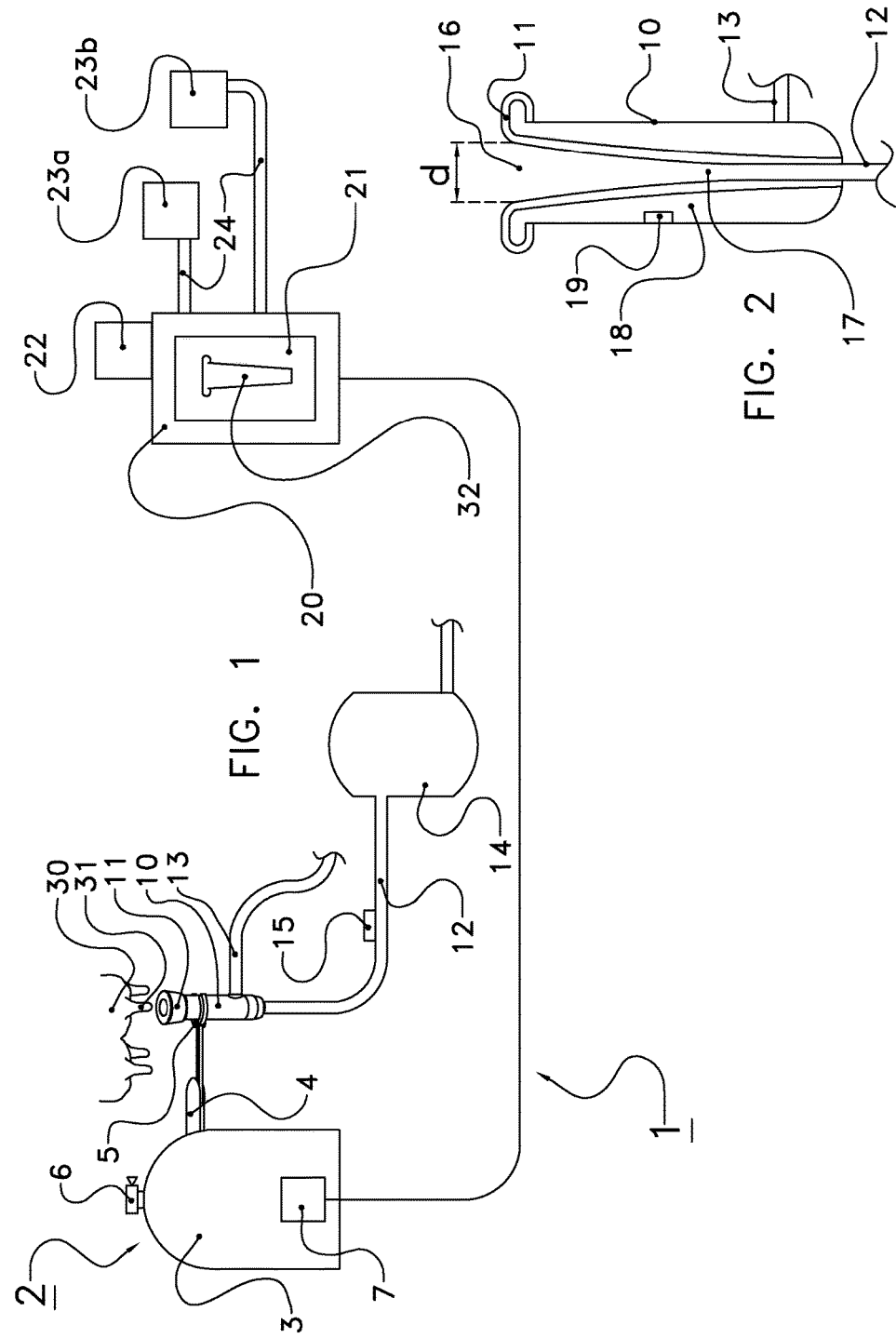

MILKING SYSTEM WITH SPARE PART MANAGEMENT

The present invention relates to a milking system comprising milking apparatus for milking of dairy animals, and comprising a plurality of wearing parts, inclusive of teat liners and/or milk lines and/or pulsation lines, and a computer system configured to control and/or monitor the milking apparatus, and to generate a signal which indicates that one of the wearing parts should be replaced and provides a characterization of that wearing part.

WO2014098739 discloses a milking system comprising milking apparatus, a plurality of exchangeable parts with an identification label containing unique data, and comprising a computer system which monitors the milking apparatus and, on the basis of the data, can inform an operator or control or monitor the milking apparatus. Although this known system aims for an improvement with regard to maintenance of the milking system, there is room for improvement.

The object of the present invention is to further improve the known system, especially to make the maintenance thereof still easier and more expedient.

The invention achieves this object with a milking system according to claim 1, in particular a milking system comprising milking apparatus for milking of dairy animals, and comprising a plurality of wearing parts, inclusive of teat liners and/or milk lines and/or pulsation lines, and a computer system configured to control and/or monitor the milking apparatus, and to generate a signal which indicates that one of the wearing parts should be replaced and provides a characterization of that wearing part, wherein the milking system further comprises a 3D printer, which is operatively connected to the computer system and which is configured to print the characterized part on the basis of the generated signal.

With the milking system according to the invention, it is possible to directly produce the wearing part to be replaced and to make it available to an operator. This makes the maintenance easier, since the operator then does not himself have to determine which wearing part must be replaced, and does not himself have to walk to a store in order to search for and pack the part. Moreover, the stock management becomes easier and more flexible inasmuch as it is only necessary to store one or more raw materials, which are processed into the required wearing part(s) on the spot by the 3D printer. This invariably takes up less space, requires little to no administration, and prevents wastage of stock items which are no longer current or are no longer supported. After all, improved teat liners or other wearing parts can easily be produced on the spot, on the basis of instructions or specifications received from a manufacturer or the like, without existing stock having to be discarded because it has become redundant. This makes it attractive to permanently continue to optimize the teat liners and the like without major logistical problems.

It is here noted that the teat liners, and to a somewhat lesser extent the milk lines and pulsation lines to teat cups of the milking apparatus, are amongst those parts of a milking system which most often need to be replaced. Moreover, they generally consist solely of one or just a few plastics, so that they lend themselves extremely well to 3D printing. Nevertheless, according to the invention, it is additionally possible to configure the 3D printer and the computer system to produce yet more parts, such as valve seats, seals, etc.

The 3D printer of the system according to the invention is configured to print the characterized part, that is to say at least for a teat liner, milk line or pulsation line. Of course, the printer will be equipped with the parts customary for this, such as one or more holders containing respective stocks of the plastic(s) in a workable form, as well as a memory containing printing instructions for printing of the wearing parts which can be characterized and printed. These details form no part of the core of the invention and, for the rest, are assumed to be known from the prior art. Furthermore, it is advantageous if the 3D printer or the computer system is equipped with a communication means configured to generate and/or send a report to an operator concerning the 3D printing of the wearing part. That report can comprise, for example, an indication of the estimated time at which the printed part will be ready, or an indication that it is ready, possibly supplemented by an indication of the nature of the part in question. The communication means concerns, for example, an email, sms or other smart phone service, and/or an audible or visible indicator in the animal shed or another room, such as an office.

Particular embodiments are described in the dependent claims, as well as in the description which now follows.

By "milking apparatus" is meant, in particular, one or more milking machines for milking of dairy animals. These can be conventional milking machines, in which the teat cups are manually connected to the teats of dairy animals. Preferably, the milking apparatus comprises, however, one or more milking robots, which place the teat cups wholly automatically. These robots operate in principle without the supervision of an operator, so that automation in the maintenance and replacement of parts can limit unnecessary transfers from an office or the like to a milking machine, to a parts store, and back again. According to the invention, the walk to the 3D printer in order to directly collect the part(s) to be replaced can suffice. Here it is further noted that a milking robot can also comprise a milking system in which one robot arm serves a plurality of milking boxes, in order to connect teat cups there. Furthermore, the milking apparatus can also comprise a carrousel system, more particularly a robotized carrousel system, in which a revolving platform, at milking places containing dairy animals to be milked, revolves past an operator, and/or past one or more connecting robot arms.

In some embodiments, the computer system comprises a memory containing a useful service life for each of the wearing parts, and is configured, furthermore, to keep record of a service life of the wearing parts, as well as to generate the signal when the service life of one of the wearing parts reaches this useful service life. In this context, "service life" is meant to symbolize "usage", i.e. a parameter or state which indicates whether a wearing part has already reached its useful service life or maximum service life. With these embodiments, the stock management with maintenance can be further automated by the system itself keeping record of when a part must be replaced, whereafter it itself produces that part in order to have it replaced, for example, by an operator. Thus maintenance is never too late, and there is no question of a wrong part.

The way in which the system keeps record of the service life or usage is not particularly limited. For instance, the system can be configured to keep record of the time from installation of the wearing part. In particular, the record keeping comprises the recording of the number of times that a wearing part has been used for an animal-related action, more particularly for a milking. Thus, a yet closer examination can be made of the actual usage. Especially for robot milking devices which are voluntarily visited by dairy animals, and thus exhibit an irregular usage, this is more important than, for example, for conventional milking devices whose usage load is much more fixed. Furthermore, manufacturers of wearing parts often specify how often a part can maximally be used.

In some embodiments, the milking system comprises at least one first sensor, operatively connected to the computer system, for measuring a value of a characteristic of a wearing part, as well as a memory containing at least one reference value for this characteristic, wherein the computer system is configured to compare the measured value and the reference value and to generate the signal on the basis of the comparison. With the aid of such a sensor, the system is still better capable of determining when a wearing part should be replaced. The first sensor can in this case be chosen from a variety of sensors, tailored, of course, to the type of wearing part to be monitored.

In particular, the wearing part concerns a teat liner, and the first sensor comprises a sensor for determining a value of a parameter with which a tipping pressure of the teat liner is determinable. Teat liners are amongst the most important parts of a milking system and need often to be replaced, so a correct stock management and maintenance for these parts is very important. By tilting of the teat liner is meant here the pressure (more accurately: the pressure difference across the teat liner) at which a teat liner, on the basis of its intrinsic elastic characteristics, tips from open to closed, or from closed to open. Note that the tipping pressure for these two situations can differ. After a passage of time, the mechanical and elastic characteristics of a teat liner will change, so that the tipping pressure (also termed "touch point pressure difference" (TPPD) or "collapse point") also changes. At a certain tipping pressure, the teat liner needs to be replaced. The first sensor is, for example, a pressure sensor, which measures the pressure in the teat liner (the pulsation space). The tipping pressure is therein, for example, definable as the pressure at which a "ripple" appears in the pulsation curve. It is herein assumed that the pressure in the teat space of the teat cup is known, and equal to the milking vacuum. It is possible, of course, to allow for a variable milking vacuum in the determination of the tipping pressure. In order to determine the tilting point, use can additionally be made of other or supplementary sensors or device, such as a camera with image recognition, which looks into the teat space and detects direct movement of the teat liner, or a flow sensor, which detects an airflow to or from the pulsation space and detects a sudden temporary change ("ripple") therein, which ripple indicates tilting, etc.

In some embodiments, the milking system comprises at least one second sensor, operatively connected to the computer system, for detecting or measuring at least one value of an animal parameter or milking parameter, wherein the computer system is configured to generate the signal on the basis of the at least one detected or measured value. In particular, the computer system comprises a memory containing a plurality of variants for at least one wearing part, and the computer system is configured to select one of the variants on the basis of the at least one detected or measured value, in particular on the basis of values measured for a plurality of dairy animals and/or milkings, as well as to generate the signal containing an indication of the selected variant. In these embodiments, apart from pure wear and tear, other things, too, can be taken into account. In this context, an important example concerns the optimization of a wearing part in light of characteristics of the dairy animals. For example, dairy animals grow, especially, of course, when they are still relatively young. Through crossbreeding and selection, their characteristics, such as physical dimensions, for example teat length or cross section, or characteristics with respect to milking, such as (maximum) milk flow or milk yield, can also change. When a herd or group of animals as a whole acquires other characteristics, a signal can likewise be generated to replace wearing parts, by wearing parts of a different type, for example. In this case, for the optimization, for example, a herd or group average can be adopted, or an extreme value or otherwise. All this can be done on the basis of individual dairy animals or on the basis of a group classification of dairy animals. To this end, the system then preferably comprises an animal recognition device which is known per se. Attractive examples of second sensors are: a camera system configured to determine teat dimensions, a milk flow meter and a milk yield meter. It is thus possible to provide, with the aid of test measurements or literature values in the computer system, a coupling between values of the parameter which are measured with the second sensor and a desired variant of the wearing part, for example on the basis of the upward or downward transgression of a threshold value for this parameter. For instance, the computer system can indicate that a wearing part should be replaced if, in each animal, or a predetermined percentage of the herd, this threshold is exceeded or fallen below. Other criteria are, of course, also possible. The variants stored in the memory can be variants having different materials, or having different dimensions or other characteristics.

In some embodiments, the computer system comprises an algorithm for generating a characterization for a wearing part on the basis of the at least one detected or measured value, in particular on the basis of values measured for a plurality of dairy animals and/or milkings, and the signal generated by the computer system comprises the generated characterization containing at least the dimensions of the wearing part to be printed. In these embodiments, the possible realizations of the wearing part are not fixed in the memory, in the form of the stored variants, but the computer system is configured to itself develop these variants on the basis of the measured values. In this context, continuously "adjustable" dimensions or shapes for the wearing part to be produced can be thought of, for example. Such an embodiment is far better capable of optimally tailoring the milking system to the momentary groups of animals to be milked.

In attractive embodiments, the wearing parts and/or variants thereof comprise teat liners having different shapes and/or dimensions. As already indicated above, teat liners are amongst the most important parts of a milking system, and they are often replaced. Moreover, teat liners are virtually the only parts which make direct contact with a dairy animal. It is hence of great importance that teat liners are well matched to the animals to be milked, and therefore teat liners exhibit the greatest variation in shapes and dimensions. When the animals in a herd of dairy animals become older and grow further, or are replaced or supplemented by other animals having other characteristics, it can be favorable to adapt a lesser or greater part of the milking machines by providing these with other wearing parts, such as, in particular, teat liners. Also if these, per se, are not yet set for replacement on the basis of service life, it can be favorable to replace the teat liners of one shape or dimension by another. An important dimension in teat liners is the cross section of the teat opening, which ranges, for example, between 20 and 24 mm in dairy cows. Young cows having small, thin teats benefit from a smaller teat opening, while, conversely, older cows having thick teats benefit from a larger opening. Also the internal shape of the teat liner can be different, for example cylindrical or conical. For this too, the computer system can be configured to generate the dimensions and/or shape of the teat liner with an algorithm, on the basis of the measured sensor values such as the teat cross section.

The invention will now be explained in greater detail with reference to some illustrative embodiments as well as the drawing, in which:

FIG. 1 shows very schematically a view of a milking system according to the invention, and FIG. 2 shows schematically in cross section a detail of a milking system according to the invention.

FIG. 1 shows a very schematic view of a milking system 1 according to the invention. The milking system 1 comprises a milking robot 2 having a housing 3, a robot arm 4, a gripper 5, a teat detection camera 6 and a computer system 7.

Furthermore, the milking system 1 comprises a plurality of teat cups 10 having a teat liner 11, a milk line 12, a pulsation line 13, a milk collecting glass 14 and a milk flow meter 15.

The milking system 1 also comprises a 3D printer 20, having a printing space 21, a control system 22, and stock holders 23a, 23b, with supply lines 24.

An udder 30 with teats 31, as well as a new teat liner 32, are additionally shown.

The very schematically shown milking robot 2 comprises, as usual, a robot arm 4 which is fastened to a housing or frame 3. The robot 2 serves to connect teat cups 10 to teats 31 of a dairy animal (not shown in detail here), such as a cow. In order to find these teats 31, a teat detection system, here a camera 6, is provided. Although this is here shown on the housing 3, it will also often be fastened on the robot arm 4. Other detection systems, such as a laser scanner or the like, are also possible.

Furthermore, the robot arm comprises a gripper 5, which collects the teat cups one by one from a magazine and puts them in place. An alternative is a robot arm having a teat cup holder on which the teat cups are detachably and retractably fastened. In all cases, the computer system 7, with the aid of the teat detection system 6, will determine the teat position in order to command the robot arm 4 to fit the teat cup 10 to the teat 31. After this, via a milk line 12 a milking vacuum, and via a pulsation line 13 a pulsating vacuum, is applied, and via the milk line 12 milk is obtained in the milk collecting vessel 14, which is afterward connected to a milk tank (not shown here). The size of the milk flow is in this case measured with a milk flow meter 15, which is here placed around the milk line 12, but can also be placed therein, or elsewhere.

In practice, a milking robot will conduct approximately 150-200 milkings per day. The teat liner 11 of the teat cup 10 will here tip approximately 100-150,000 times during opening and reclosing. It will be clear that teat liners are subjected to heavy load. Manufacturers advise the replacement of teat liners after about 2,500 (rubber) to 10,000 (silicone) milkings, thus approximately after every 2 to 10 weeks. This indicates, moreover, that there is a wide spread in the recommended maximum useful life of teat liners, and that good maintenance and good associated stock management are important.

The computer system 7 is configured to monitor the wearing parts, especially the teat liners 11, and to a somewhat lesser extent the milk lines 12 and pulsation lines 13. In the remainder of this description, solely teat liners will be examined, but something similar will also apply to other wearing parts. For the record keeping, the computer system 7 records, for example, how often a teat liner has actually been used. In simple form, this can be the recording of the number of days for which the teat liner has been used, in a somewhat more accurate form it can relate to the number of milkings. After all, the visit of dairy animals to a milking robot 2 is voluntary, and thus irregular. In a yet more accurate variant, it is even possible for the computer system to record the number of pulsations to which the teat liner 11 has been subjected. On the basis of, for example, one or more of the above-stated measured values, as well as, for example, in dependence on the specification of the manufacturer, which states a maximum number of milkings or pulsations, the computer system 7 determines whether, and possibly when, the teat liner 11 should be replaced, for example by simple comparison of the measured value with the specified value. In this context, account could also be taken of the time which is necessary to produce and install the replacement part.

For the rest, it is also possible to decide to replace on the basis of another value, for example if a milk flow meter 15 indicates that for various successive milkings the milk flow is lower than expected on the basis of earlier measurements, or, for example, than with other teat cups in the same milking process. On the left and right, teats should namely on the whole give a comparable result. An unexpected but enduring difference may be an indication that the teat liner has been damaged or otherwise no longer works well and must be replaced. Furthermore, use can also be made of a sensor, for example, such as the camera 6. This can be made suitable to determine the dimensions, such as the thickness, of the teats 31. This thickness can also be used to determine whether a teat liner should be replaced. Teats can namely become thicker and/or longer during a lactation, as well as in ageing dairy animals. If this applies to a plurality of, or even all animals in a herd or sub-group thereof, it may be favorable to replace the teat liner, even if this has not yet reached its full useful service life.

Should the computer system 7 finally decide to replace a teat liner 11, it sends a signal to the 3D printer 20. This signal contains an indication of what must be printed, such as a new teat liner. In particular, but not necessarily, the signal contains supplementary data, such as dimensions, material choice or the like. This is represented in greater detail in FIG. 2. It is here sufficient to note that the 3D printer 20, with the aid of its control system 22 and making use of raw material from one or more holders 23a, 23b, . . . prints the required new teat liner 32 in the printing space 21. When this teat liner 32 is ready, or else shortly beforehand, the computer system 7, of which the control system 22 can also be deemed to form part, can send a report to an operator. He can then take the teat liner 21 out of the 3D printer and replace the teat liner 11. It is also possible to print a plurality of wearing parts, such as a set of teat liners, successively or possibly simultaneously, and to keep these ready in or close to the 3D printer, or a stock holder for this purpose.

FIG. 2 shows schematically in cross section a detail of a milking system according to the invention, to be precise a cross section of a teat cup 10, having a teat liner 11 which opens out into a milk line 12 and has an opening 16 having a cross section d. A teat space is indicated with 17, and a pulsation space, containing a sensor device 19 and also a pulsation line 13, with 18.

The teat liner 11 forms together with the teat cup 10, or at least the cup wall thereof, a pulsation space 18. This is subjected during a milking, via the pulsation line 13, to a variable pressure. In one and the same rhythm, the teat liner 11 will here periodically close off the teat space 17, in which a teat is located during the milking, from the milk line 12, in which the milking vacuum prevails. This opening and closing of the teat liner 11 is reinforced by intrinsic elastomechanical characteristics of the teat liner. To be precise, the teat liner, if the pressure difference across it reaches a defined value, will automatically tip from open to closed, or vice versa. This tilting, these elastomechanical characteristics, change over time, as a result of ageing processes. The teat liner consequently works less well, or at least differently. Instead of the specified useful service life, this tilting, for example, can also be examined, so that a teat liner can often be utilized for longer. In order to assess the tilting, use can be made of a sensor device 19 comprising, for example, a first sensor part, which detects tipping of the teat liner, and a second sensor part, which registers the associated pressure (or pressure difference). The first sensor part is then, for example, a camera on the teat cup 10, or a proximity sensor. Alternatively, it is also possible for the sensor device 19 to comprise only a pressure sensor, wherein the device, furthermore, is configured to detect a rippling in the pressure pattern during the pulsation, which rippling is caused by the tilting.

With the shown teat cup design, a useful service life can suitably be monitored. Moreover, with the aid of, for example, the sensors shown here or in FIG. 1, it is further attempted to optimize the milking device, or at least the teat cup 10 with teat liner 11, for the animals to be milked. When the measured teat thickness for the dairy animals changes, for example, it may be better, for the milking result, to adapt the cross section d of the teat opening 16 by printing of an adapted teat liner 11 in the 3D printer. It is also possible to adapt one or more other characteristics, such as the shape of the teat liner 11, which is here conical, but could possibly also be made more cylindrical, triangular or even irregular, or else the material of which the teat liner is made. To this end, the 3D printer 20 of FIG. 1 can contain a plurality of raw materials. In FIG. 1 there are two materials shown, such as silicone and nitrile rubber, but other materials, or combinations thereof, are also possible. In the case of another material, the characteristics, especially the elastomechanical characteristics, are also different, which can be a factor for positively influencing the milking behavior. If the computer system 7 decides on this on the basis of sensor measurements, it can send to the 3D printer 20 a signal containing a material choice and/or information on the desired shape and/or dimension. In this case, in the memory of the system 7 and/or the control system 22 can be stored a number of variants, so that the 3D printer has only to load the associated coordinates and other instructions in order to print the teat liner. Alternatively or additionally, the computer system 7 or the control system 22 computes the ideal desired teat liner on the basis of the measured sensor values. For instance, it is possible to choose the cross section d of the teat opening exactly, and not be bound to steps of 0.5 or 1 mm. An elasticity of the material can also be chosen through suitable combinations of the raw materials. All this can be calibrated beforehand by reference measurements and prints, whereafter the desired value can respectively be derived by interpolation.

The invention claimed is:

1. A milking system, comprising:
    a milking apparatus for milking of dairy animals, the milking apparatus comprising a plurality of wearing parts, selected from the group consisting of teat liners, milk lines, and pulsation lines; and
    a computer system configured to control and/or monitor the milking apparatus, and to generate a signal which indicates that one of the wearing parts should be replaced and which provides a characterization of that wearing part,
    wherein the milking system further comprises a 3D printer, which is operatively connected to the computer system and which is configured to print the characterized part on the basis of the generated signal.

2. The milking system as claimed in claim 1, wherein the computer system comprises a memory containing a useful service life for each of the wearing parts, and is configured, furthermore, to keep record of a service life of the wearing parts, as well as to generate the signal when the service life of one of the wearing parts reaches this useful service life.

3. The milking system as claimed in claim 2, wherein the record keeping comprises recording of the number of times that a wearing part has been used for an animal-related action.

4. The milking system as claimed in claim 3, wherein the animal-related action comprises a milking.

5. The milking system as claimed in claim 2, wherein the milking system comprises at least one first sensor, operatively connected to the computer system, for measuring a value of a characteristic of a wearing part, as well as a memory containing at least one reference value for this characteristic, wherein the computer system is configured to compare the measured value and a reference value and to generate the signal on the basis of the comparison.

6. The milking system as claimed in claim 5, wherein the wearing part concerns a teat liner, and wherein the first sensor comprises a sensor for determining a value of a parameter with which a tipping pressure of the teat liner is determinable.

7. The milking system as claimed in claim 1, wherein the milking system comprises at least one second sensor, operatively connected to the computer system, for detecting or measuring at least one value of an animal parameter or milking parameter, wherein the computer system is configured to generate the signal on the basis of the at least one detected or measured value.

8. The milking system as claimed in claim 7, wherein the computer system comprises a memory containing a plurality of variants for at least one wearing part, and wherein the computer system is configured to select one of the variants on the basis of the at least one detected or measured value, as well as to generate a signal containing an indication of the selected variant.

9. The milking system as claimed in claim 8, wherein the wearing parts and/or variants thereof form teat liners having different shapes and/or dimensions.

10. The milking system as claimed in claim 8, wherein the at least one detected or measured value comprises values measured for a plurality of dairy animals and/or milkings.

11. The milking system as claimed in claim 7, wherein the computer system comprises an algorithm for generating a characterization for a wearing part to be printed on the basis of the at least one detected or measured value, and wherein the signal generated by the computer system comprises the generated characterization containing at least dimensions of the wearing part to be printed.

12. The milking system as claimed in claim 11, wherein the at least one detected or measured value comprises values measured for a plurality of dairy animals and/or milkings.

* * * * *